US012742336B2

(12) United States Patent
D'Oracio De Almeida et al.

(10) Patent No.: US 12,742,336 B2
(45) Date of Patent: Sep. 22, 2026

(54) X-SHAPED REFRACTORY ANCHOR DEVICE AND SYSTEM

(71) Applicant: Brand Shared Services LLC, Atlanta, GA (US)

(72) Inventors: Eduardo Fernando D'Oracio De Almeida, League City, TX (US); Lance Edward Zier, Houston, TX (US); James Egger, Houston, TX (US)

(73) Assignee: Brand Shared Services LLC, Atlanta, GA (US)

( * ) Notice: Subject to any disclaimer, the term of this patent is extended or adjusted under 35 U.S.C. 154(b) by 153 days.

(21) Appl. No.: 18/744,176

(22) Filed: Jun. 14, 2024

(65) Prior Publication Data

US 2024/0328186 A1 Oct. 3, 2024

Related U.S. Application Data

(63) Continuation of application No. 17/679,180, filed on Feb. 24, 2022, now Pat. No. 12,018,511.

(Continued)

(51) Int. Cl.

*E04H 5/02* (2006.01)
*B01J 19/00* (2006.01)

(Continued)

(52) U.S. Cl.

CPC ............ *E04H 5/02* (2013.01); *B01J 19/0053* (2013.01); *B01J 19/02* (2013.01); *F27D 1/10* (2013.01); *F27D 1/141* (2013.01)

(58) Field of Classification Search

CPC .. F27D 1/141; F27D 1/10; F27D 1/14; F23M 5/04

See application file for complete search history.

(56) References Cited

U.S. PATENT DOCUMENTS 1,945,925 A 2/1934 Stiefel
1,962,906 A 6/1934 Mueller (Continued)

FOREIGN PATENT DOCUMENTS

BR 302019000493-3 9/2019
CA 186015 8/1918

(Continued)

OTHER PUBLICATIONS

HexMesh (Hanlock-Causeway) 1, Dec. 16, 2013, 1 page.

(Continued)

*Primary Examiner* — Brian E Glessner
*Assistant Examiner* — Daniel J Kenny
(74) *Attorney, Agent, or Firm* — Foley & Lardner LLP

(57) ABSTRACT

Refractory anchoring devices include a main anchor body and a mounting stud. The main anchor body includes a plurality of anchor branch segments angled with respect to one another and a plurality of extension segments, each extension segment extends outwardly from a respective one of the plurality of anchor branch segments. The mounting includes a bottom vessel-attaching portion and an upper anchor-attaching portion that is wider than the bottom vessel-attaching portion. The upper anchor-attaching portion includes a notch that is configured to at least partially receive the main anchor body.

12 Claims, 9 Drawing Sheets

Related U.S. Application Data

(60) Provisional application No. 63/157,993, filed on Mar. 8, 2021.

(51) Int. Cl.

*B01J 19/02* (2006.01)
*F27D 1/10* (2006.01)
*F27D 1/14* (2006.01)

(56) References Cited

U.S. PATENT DOCUMENTS

| | | | | |
|---|---|---|---|---|
| 1,974,279 | A | | 9/1934 | Jones |
| 4,479,337 | A | | 10/1984 | Crowley |
| 4,581,867 | A | | 4/1986 | Crowley |
| 4,651,487 | A | * | 3/1987 | Nishikawa .............. F27D 1/141 52/378 |
| 4,660,343 | A | | 4/1987 | Raycher et al. |
| 4,680,908 | A | | 7/1987 | Crowley |
| 4,711,186 | A | | 12/1987 | Chen et al. |
| 4,753,053 | A | | 6/1988 | Heard |
| 4,945,689 | A | | 8/1990 | Johnson |
| D375,892 | S | | 11/1996 | Kraemer, Jr. |
| D393,588 | S | | 4/1998 | Tuthill |
| 6,393,789 | B1 | | 5/2002 | Lanclos |
| 6,887,551 | B2 | | 5/2005 | Hyde et al. |
| D559,672 | S | | 1/2008 | Alexander |
| D576,479 | S | | 9/2008 | Alexander |
| 8,656,679 | B1 | | 2/2014 | Duhon |
| 9,127,890 | B2 | | 9/2015 | Garot |
| 9,279,245 | B2 | | 3/2016 | Garot |
| 9,861,949 | B2 | | 1/2018 | Simon et al. |
| 10,352,619 | B2 | | 7/2019 | Yoder et al. |
| 10,508,861 | B1 | | 12/2019 | D'Oracio De Almeida et al. |
| 10,907,899 | B1 | | 2/2021 | Lanclos |
| 10,982,903 | B2 | | 4/2021 | D'Oracio De Almeida et al. |
| 2004/0226251 | A1 | | 11/2004 | Hyde et al. |
| 2011/0126745 | A1 | | 6/2011 | Porterfield |
| 2015/0147236 | A1 | | 5/2015 | Simon et al. |
| 2015/0267122 | A1 | | 9/2015 | Hinson et al. |
| 2017/0321962 | A1 | | 11/2017 | Decker et al. |
| 2018/0320973 | A1 | | 11/2018 | Yoder et al. |
| 2018/0345401 | A1 | | 12/2018 | Giaramita et al. |
| 2020/0078762 | A1 | | 3/2020 | Lesage et al. |
| 2020/0340510 | A1 | | 10/2020 | Garot et al. |
| 2021/0116180 | A1 | | 4/2021 | D'Oracio De Almeida et al. |
| 2022/0205720 | A1 | | 6/2022 | Garot et al. |
| 2022/0205721 | A1 | | 6/2022 | Garot et al. |
| 2023/0235962 | A1 | | 7/2023 | Garot et al. |

FOREIGN PATENT DOCUMENTS

| | | | |
|---|---|---|---|
| CN | 203772010 | U | 8/2014 |
| JP | H09-229569 | A | 9/1997 |
| MX | 60281 | | 2/2019 |
| WO | WO-97/09577 | A1 | 3/1997 |

OTHER PUBLICATIONS

HexMesh (Hanlock-Causeway) 2, Dec. 16, 2013, 1 page.
HexMesh (RAI), published at least by Aug. 8, 2018, 2 pages.
K-Bar hex anchors (drawing), published at least by Aug. 8, 2018, 1 page.
K-Bar hex anchors (Kraemer Gunite); 2013, 1 page.
K-Bar hex anchors (RAI), published at least by Aug. 8, 2018, 2 pages.

* cited by examiner

X-SHAPED REFRACTORY ANCHOR DEVICE AND SYSTEM

CROSS-REFERENCE TO RELATED APPLICATION

This application is a continuation of U.S. patent application Ser. No. 17/679,180, filed on Feb. 24, 2022, which claims the benefit of and priority to U.S. Provisional Patent Application App. No. 63/157,993, filed Mar. 8, 2021, each of which is hereby incorporated herein by reference.

TECHNICAL FIELD

The present invention relates generally to the field of refractory linings for high-temperature vessels used in industrial and chemical processes, and more particularly to anchor systems for holding refractory materials in place in high-temperature and abrasive environments.

BACKGROUND

Thermal-process vessels used in oil refineries and other petrochemical and chemical process facilities have highly abrasive and high-temperature environments. To protect the vessel shells (e.g., sidewalls), their internal surface is typically lined with a refractory material such as a thin layer of concrete. To secure the refractory material in place, anchoring devices and systems have been developed.

The most common form of thin-layer abrasion-resistant refractory concrete anchoring system is called HEXMESH (aka “hexmetal” or just “hex”) anchor sheets. Hex includes a series of steel strips that are interlocked (i.e., “clinched” together by a tab-and-slot arrangement) to form a sheet or mat of hexagonal cells in a honeycomb-patterned array or grid. The hex sheets are installed by fitting (bending/shaping and cutting/sizing) them to whatever vessel shape and size is to be lined, and then welding them in place by a large number of welds to create a strong attachment to the underlying vessel shell. Once welded, mixed refractory concrete is then rammed, beaten, or packed into the hex cells. The refractory concrete and hex sheet together form a barrier system that protects the underlying vessel shell from heat, abrasion, and chemical attack.

Over the decades that hex has been in use, several weaknesses in this system have been exposed. The hex and refractory system must move in concert with any flex that occurs in the vessel shell (e.g., due to thermal cycling) because the hex sheet is fitted and welded flush with and rigidly to the vessel shell. This makes the hex and refractory system prone to “biscuiting,” which means individual hex cells (the refractory in each hex cell is discrete and isolated from the refractory in each other hex cell) will tend to “pop” the refractory concrete out in a hexagonal biscuit shape when the vessel shell experiences thermal expansion or contraction. In addition, this can compromise the protective capabilities of the refractory concrete liner by opening gaps that allow catalysts, gases, carbon, and other process-related materials to contact the exposed portion of the vessel shell. This in turn can lead to further failure of the refractory concrete liner system and the need for premature replacement of extremely expensive process vessels and components. Furthermore, installing hex is very time-consuming, tedious, and cumbersome because of the large number of welds required and because the sheets must be cut on-site to custom-fit each vessel, beat into shape and place with a hammer, and sometimes cut into small pieces to fit through access openings to the work areas, with this being particularly an issue for irregularly shaped vessels.

Other refractory anchoring devices and systems include D-BAR anchors (e.g., U.S. Pat. No. 6,393,789), C-BAR anchors, and G3 anchors. Some of these are provided in sheet form and thus must by bent and cut to fit the individual vessel in the same manner as the HEXMESH sheets. And some of these include multiple parts that are interlocked together with a clinching system in the same manner as the HEXMESH sheets. As such, these other refractory anchoring devices and systems include some or all of the same drawbacks.

Accordingly, it can be seen that needs exist for improvements in anchoring devices, systems, and methods for refractory liners for thermal vessels. It is to the provision of solutions to these and other problems that the present invention is primarily directed.

SUMMARY

Generally described, the present invention relates to refractory anchoring devices having unenclosed cell openings. The refractory anchoring devices each include a main body and a mounting feature for mounting to a thermal vessel. The main body includes four anchor branch segments angled with respect to each other to form an X shape with four unenclosed cell openings, including two opposite triangular side openings and two opposite triangular end openings. In some embodiments, the main body further includes extension segments extending from and angled relative to respective branch segments to define two of the opposite openings as semi-hexagonal. Some embodiments include reinforcement segments extending from branch segments into openings, voids extending through branch segments, two anchor strips inter-engaged to form the four branch segments, and/or a single stud-welding stud for the mounting feature.

Another aspect of the invention relates to refractory anchoring systems that include an array of refractory anchoring devices having unenclosed cell openings. The refractory anchoring devices are arranged into the refractory anchoring systems so that the unenclosed cell openings of adjacent ones of the anchoring devices cooperate to form substantially hexagonal and/or rhombus shaped cells and provide flow passageways for the refractory to interconnect the cells.

And another aspect of the invention relates to refractory lining methods that use an array of refractory anchoring devices having unenclosed cell openings. The method includes mounting the refractory anchoring devices in an arrangement to form refractory anchoring systems with the unenclosed cell openings of adjacent ones of the anchoring devices cooperating to form substantially hexagonal and/or rhombus shaped cells and provide flow passageways for the refractory to interconnect the cells. In some embodiments, the refractory anchoring devices include a single stud-welding stud for a mounting feature and the mounting process includes stud-welding the anchor devices in place (for example using BRANDTECH precision welding equipment and processes).

These and other aspects, features, and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of example embodiments are explanatory of example embodiments of the invention, and are not restrictive of the invention, as claimed.

DETAILED DESCRIPTION OF EXAMPLE EMBODIMENTS

Figure 1:
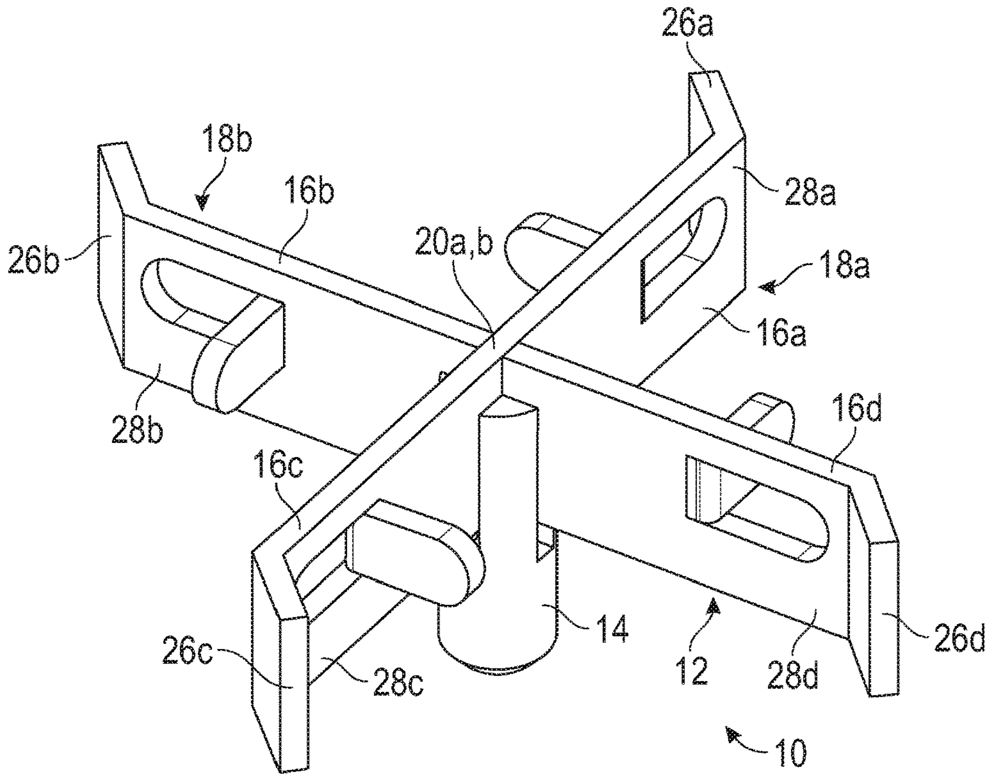
FIG. 1 is a top perspective view of a refractory anchor according to a first example embodiment of the invention.

Generally described, the present invention relates to an anchoring device, system, and method for a refractory material for together forming a protective lining/barrier system for a thermal vessel. The anchoring device, system, and method can be used to hold refractory lining/s that protect the mechanical and structural integrity of the equipment it is installed on. For example, the anchoring device, system, and method can be used for protecting thermal vessels such as high-temperature cyclone separators (e.g., fluid catalytic crackers aka FCCs), reformers, hydrocrackers, crude units, thermal reactors, sulfur recovery units, boilers, burners, furnaces, columns, and tanks, piping for these, and other high-temperature industrial-process containers. These thermal vessels operate at high temperatures of typically about 250 C to about 1800 C. The anchoring device, system, and method can be used for protecting such thermal vessels in oil refineries, other petrochemical-process facilities, chemical-process facilities, chemical-manufacturing plants, cement plants, fertilizer plants, steel mills, and other facilities and industries using such high-temperature vessels. And the anchoring device, system, and method can be used for holding and anchoring refractory materials, for example concrete and/or other monolithic materials typically applied in a viscous state and cured on site, but in some embodiments precast or otherwise pre-formed.

Referring to the drawings, FIGS. 1-16 show a refractory anchoring device 10 according to a first example embodiment of the invention. The anchor 10 includes a main anchor body 12 having the shape of an "X" (and thereby defining two opposing side openings and two opposing end openings) and a mounting element or feature 14 for mounting the main body 12 to a wall (e.g., shell) of the thermal vessel (not shown) to be protected. The anchor 10 can be installed in an array to form an anchoring system that secures a relatively thin layer (e.g., about 20 mm to about 75 mm) of refractory material in place and that resists abrasion for long life of the anchoring system.

The main anchor body 12 includes four anchor branch segments 16*a-d* (collectively, the branch segments 16) extending radially outward from the mounting element 14. In the depicted embodiment, for example, the four branch segments 16 are formed by two anchor strips 18*a-b* (collectively, the strips 18) that each have a respective center portion 20*a-b* (collectively, the center portions 20), and the center portions 20*a* and 20*b* inter-engage and assemble together to form the main anchor body 12 (see FIG. 5). Thus, the first branch segment 16*a* is one outer part of the first strip 18*a* that extends radially outward from the center portion 20*a* of the first strip 18*a* (see FIGS. 1 and 3). The second branch segment 16*b* is the other/opposite outer part of the first strip 18*a* that extends radially outward from the center portion 20*a* of the first strip 18*a*. Similarly, the third branch segment 16*c* is one outer part of the second strip 18*b* that extends radially outward from the center portion 20*b* of the second strip 18*b*. And the fourth branch segment 16*d* is the other/opposite outer part of the second strip 18*b* that extends radially outward from the center portion 20*b* of the second strip 18*b*.

The four branch segments 16 are each arranged at an angle $\alpha$ with respect to each other to form four unenclosed, semi-polygonal, cell openings (e.g., notches or recesses) 24*a-d* (collectively, the openings 24) between them. In the depicted embodiment, for example, each of the four branch segments 16 is arranged at the same angle $\alpha$ of about 90 degrees from the two adjacent branch segments in a substantially symmetrical configuration (see FIGS. 1 and 3), with each of the cell openings 24 having a right triangular shape (forming two sides of a right triangle). Thus, the two strips 18 intersect at an angle of about 90 degrees. In other embodiments, the two strips intersect at a different angle so that each of the branch segments forms an acute angle with one adjacent branch segment and an obtuse angle with the other adjacent branch segment.

Furthermore, the four X-shaped branch segments 16 typically each have substantially the same maximum relative height (relative to the bottom edge/surface of the mounting element 14) so that they together define a top plane. For example, the four branch segments 16 can each have substantially planar/flat upper edges/surfaces that together define the top plane, as depicted (see FIGS. 2, 4, and 23). Also, the four branch segments 16 typically each have substantially the same minimum relative height or clearance (relative to the bottom edge/surface of the mounting element 14) so that they together define a bottom plane. For example, the four branch segments 16 can each have substantially planar/flat lower edges/surfaces that together define the bottom plane (see FIGS. 1, 4, and 23). Further, the branch segments 16 thus typically have substantially the same segment/absolute height between the upper and lower edges, at least at the center portions 20 of the two anchor strips 18 where they attach to the mounting element 18, as depicted (see FIGS. 1-2 and 4). In typical embodiments, for example, the segment height (between the upper and lower edges) of the four branch segments 16 is about 12 mm to about 30 mm (e.g., about 21 mm).

In some embodiments, the four branch segments do not each have substantially the same segment/absolute height (the height of the segment itself, top minus bottom, not the height above the bottom of the mounting element 14) along their entire lengths, nevertheless they still each have substantially the same segment/absolute height at the center portions of the two anchor strips where they attach to the mounting element. And in other embodiments, the upper and/or lower edges includes notches, castellations, or the like, and/or they are ramped or stepped, nevertheless they are still coplanar because all four branch segments have substantially the same maximum relative height and/or segment/absolute height so that they define one top plane and one bottom plane.

In addition, the main body 12 of some embodiments (such as that depicted) further includes one or more extension segments 26 extending from one or more of the branch segments 16. In the depicted embodiment, for example, the main body 12 includes four extension segments **26*a-d* (collectively, the extension segments 26) with each one extending from a respective one of the four branch segments 16*a-d* (see FIGS. 1 and 3). Typically, the extension segments 26 extend from outer end portions 28*a-d* of the respective branch segments 16**. In some embodiments, the extension segments extend from the branch segments before their end edges (with the branch segments extending outwardly beyond where the extension segments extend from) or are otherwise configured. And in some embodiments, the main body does not include any extension segments.

The four extension segments 26 are each arranged at an angle β relative to their respective branch segments 16 to define portions of the two opposite end cell openings **24*b* and 24*d*. In the depicted embodiment, for example, each of the four extension segments 26 is arranged at an angle β of about 45 degrees from its respective branch segment 16 in a substantially symmetrical configuration (see FIGS. 1 and 3). In this configuration, each extension segment 26 is substantially aligned with (and extending in the opposite direction from) one adjacent extension segment 26, substantially parallel with (and extending in the same direction as) the other adjacent extension segment 26, and substantially parallel with (and extending in the opposite direction from) the opposite extension segment 26 (these two extension segments 26 extend from the same strip 18 but from opposite sides of it). As such, each pair of the extension segments 26 is symmetrically arranged relative to each other pair of the extension segments 26**. In other embodiments, the extension segments extend from the branch segments all at the same larger or smaller angle, at two to four different angles from each other, or in another configuration.

Figure 3:
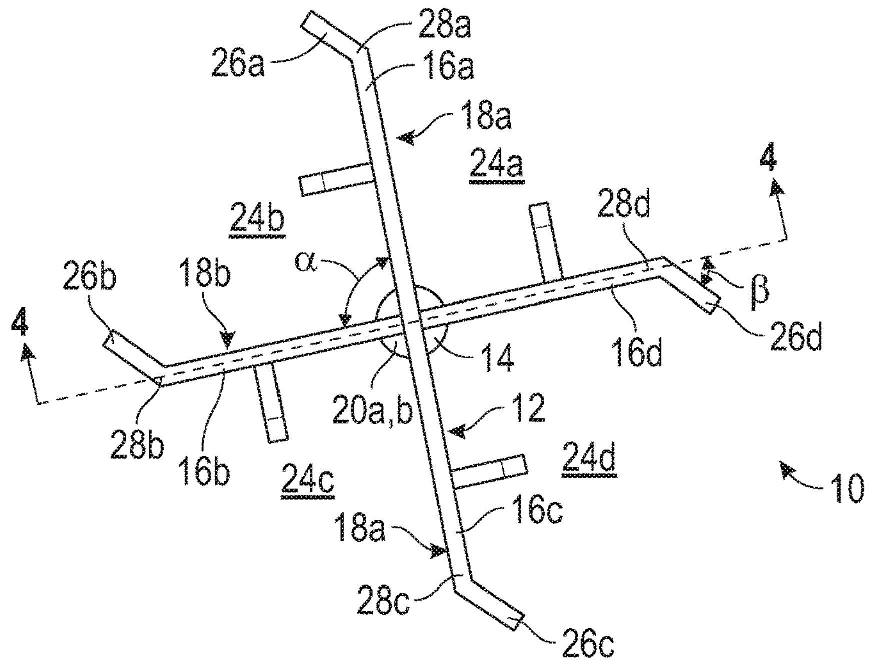
FIG. 3 is a top view of the refractory anchor of FIG. 1.
Figure 4:
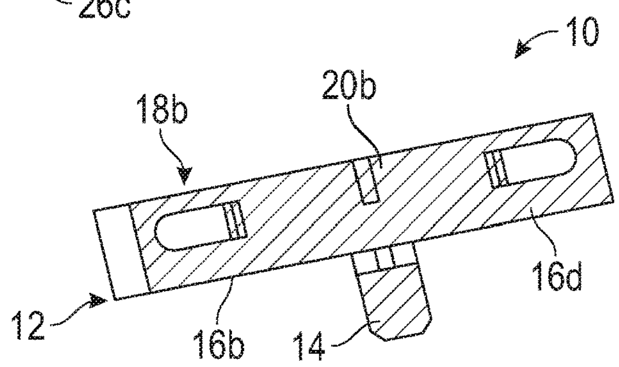
FIG. 4 is a cross-sectional view of the refractory anchor taken at line 4-4 of FIG. 1.
Figure 5:
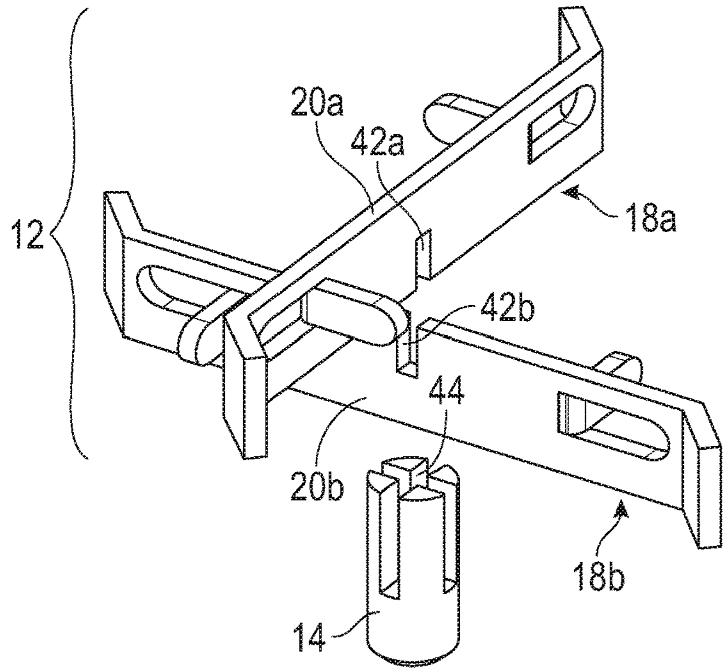
FIG. 5 is an exploded top perspective view of the refractory anchor of FIG. 1
Figure 6:
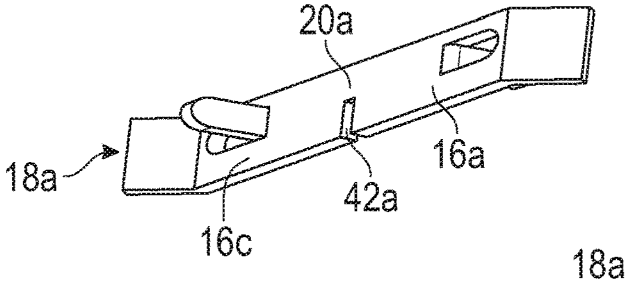
FIG. 6 is a perspective view of a first anchor strip (defining two branch segments) of the refractory anchor of FIG. 5.
Figure 7:
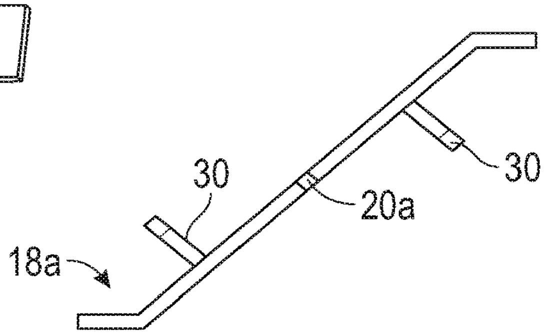
FIG. 7 is a bottom view of the anchor strip of FIG. 6.
Figure 8:
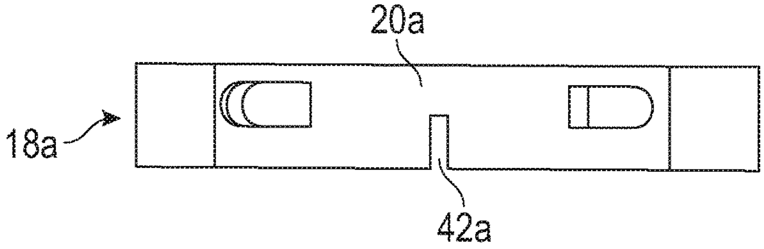
FIG. 8 is a side view of the anchor strip of FIG. 6.
Figure 9:
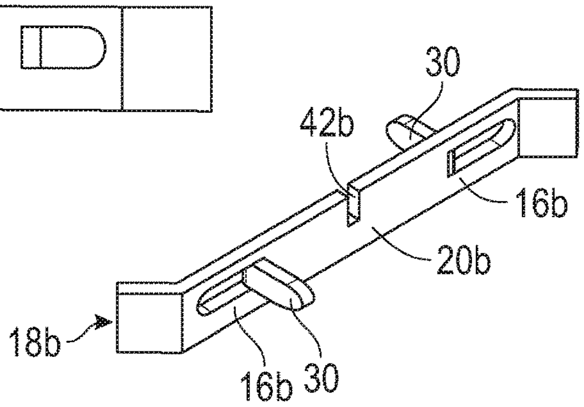
FIG. 9 is a perspective view of a second anchor strip (defining two branch segments) of the refractory anchor of FIG. 5.
Figure 10:
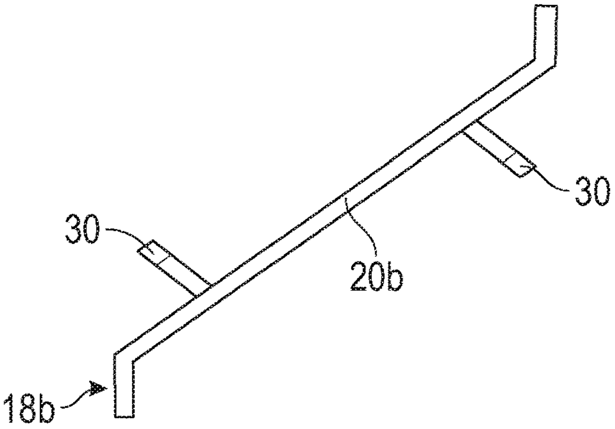
FIG. 10 is a bottom view of the anchor strip of FIG. 9.
Figure 11:
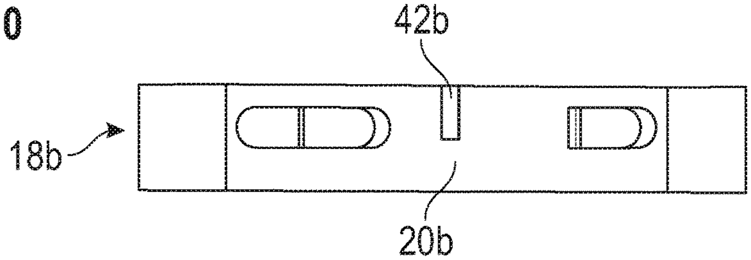
FIG. 11 is a side view of the anchor strip of FIG. 9.
Figure 12:
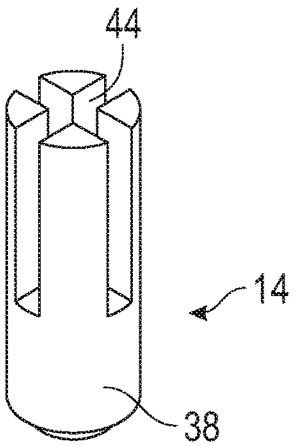
FIG. 12 is a perspective view of a mounting element of the refractory anchor of FIG. 5.
Figure 13:
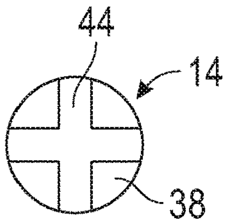
FIG. 13 is a top view of the mounting element of FIG. 12.
Figure 14:
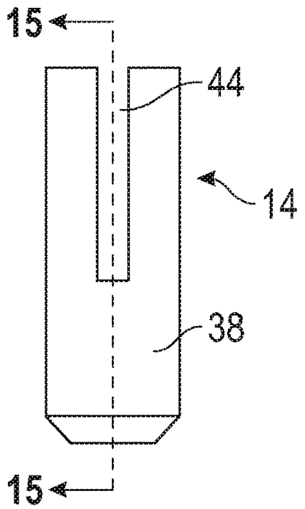
FIG. 14 is a side view of the mounting element of FIG. 12.
Figure 15:
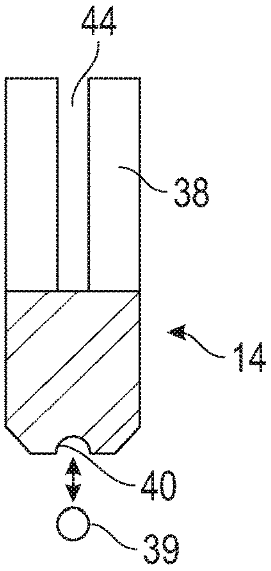
FIG. 15 is a cross-sectional view of the mounting element taken at line 15-15 of FIG. 14.
Figure 16:
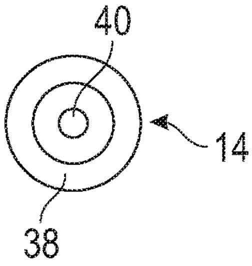
FIG. 16 is a bottom view of the mounting element of FIG. 12.
Figure 17:
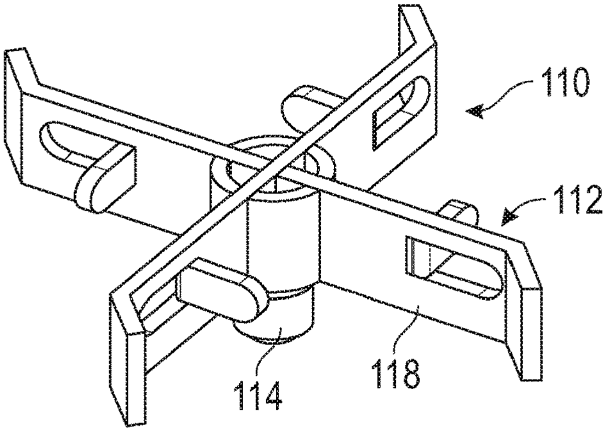
FIG. 17 is a top perspective view of a refractory anchor according to a second example embodiment of the invention.
Figure 18:
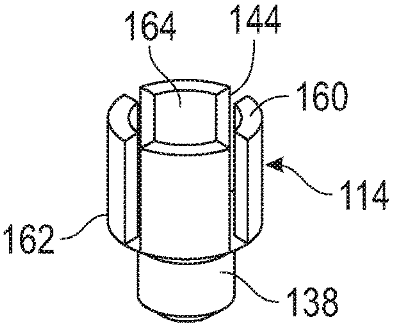
FIG. 18 is a perspective view of a mounting element of the refractory anchor of FIG. 17.
Figure 19:
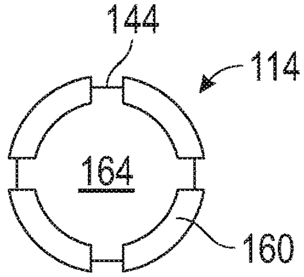
FIG. 19 is a top view of the mounting element of FIG. 18.
Figure 20:
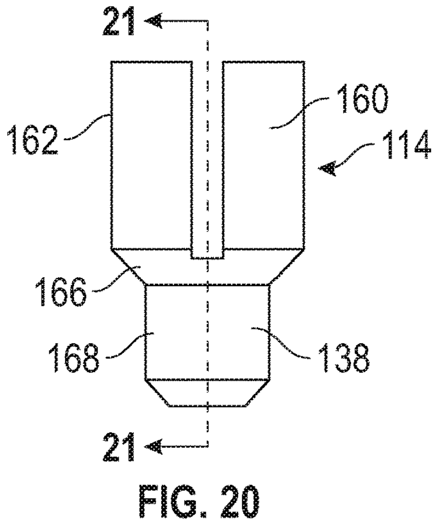
FIG. 20 is a side view of the mounting element of FIG. 18.
Figure 21:
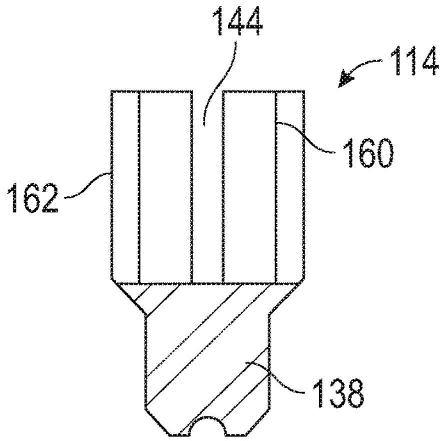
FIG. 21 is a cross-sectional view of the mounting element taken at line 21-21 of FIG. 20.
Figure 22:
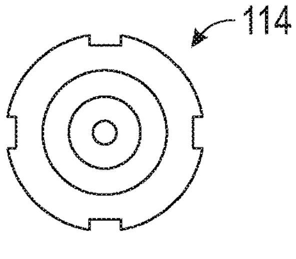
FIG. 22 is a bottom view of the mounting element of FIG. 18.

In this configuration, the main body 12 is substantially symmetrical about a centerline bisecting opposing side openings **24*a* and 24*c* and substantially symmetrical about a perpendicular centerline bisecting opposing end openings 24*b* and 24*d*, with the branch segments 16 extending from the mounting element 14 at uniform angle α and the extension segments 26 extending from the branch segments 16 at uniform angle β (see FIG. 3). So the two opposite end openings 24*b* and 24*d* are formed by the branch segments 16 and the extension segments 26 and have a trapezoidal (e.g., semi-hexagonal) shape, with the extension segments 26 defining an extended portion of the otherwise triangular end openings and extending them into semi-hexagonal openings. And the two opposite side openings 24*a* and 24*c* are formed by the branch segments 16** and have a triangular shape.

In addition, each of the branch segments 16 typically has a length that is substantially the same as each other branch segment 16, and each of the extension segments 26 typically has a length that is substantially the same as each other extension segment 26 and that is less than (and not more than about half of) the branch segments 16. In this way, the two end openings **24*b* and 24*d* define a regular (equilateral) semi-hexagonal shape of the same size/area, and the two side openings 24*a* and 24*c* define a regular (equilateral) triangular shape of the same size/area. So a number of the anchors 10 can be arranged together with any end opening 24*b* or 24*d* of one anchor cooperating with any end opening of an adjacent anchor to form a substantially regular hexagonal-shaped cell, and with any side opening 24*a* or 24*c* of one anchor cooperating with any side opening of an adjacent anchor to form a substantially regular rhombus-shaped (i.e., diamond-shaped) cell (see FIGS. 23-24**), to better retain the refractory and thereby reduce the likelihood of biscuiting.

In typical embodiments, for example, the length of the branch segments 16 is about 80 mm to about 125 mm (e.g., about 90 mm), and the length of the extension segments 26 is about 12 mm to about 30 mm (e.g., about 16 mm), with the cell openings 24 thus being about 35 to about 150 (e.g., about 50 mm) across (e.g., equal to the diagonal of the triangular openings, i.e., the third/missing/open side of the triangle formed by adjacent branch segments). In other embodiments, the branch and/or extension segments have a longer or shorter length, have different lengths from each other, or are provided with other lengths as may be desired.

For example, in some alternative embodiments only one of the branch segments at each end has an extension segment extending from it (so there are two extension segments, one at each end of the anchor). In this way, two anchoring devices can be arranged side-to-side immediately adjacently (e.g., with nominal spacing sufficient to avoid contacting during thermal expansion and contraction cycling during use) in an anchoring system, with each extension segment positioned at a branch segment of the adjacent anchor without an extension segment (to fill the position where an extension segment was not included in that anchor).

In addition, the two anchor strips 18 that form the X-shaped branch segments 16 and the angled extension segments 26 typically have substantially the same thickness along substantially their entire lengths. This minimizes the amount of material in the center of the anchor body to reduce unwanted hotspots and heat transfer.

Furthermore, the main body 12 of typical embodiments further includes one or more reinforcement segments 30 extending into one or more of the four openings 24. In the depicted embodiment, for example, the main body 12 includes four reinforcement segments 30 with each one extending into a respective one of the four openings 24 so that each of the four openings 24 has a respective reinforcement segment 30 extending into it (see FIG. 2). In example embodiments, the reinforcement segments 30 each are generally linear and have a length of about 10 mm to about 15 mm (e.g., about 11 mm), though they can be provided in other regular or irregular shapes, sizes, and/or configurations, as may be desired for an application. The reinforcement segments 30 are thus in addition to the four branch segments 16 and the four extension segments 26 of the anchor 10 and do not define the shape (i.e., the peripheral boundary) of the openings 24. The reinforcement segments 30 provide additional contact surface area for engaging and securing the refractory in place, and they protrude into the unenclosed cell openings 24 to reduce the unobstructed distance across the openings 24, thereby better securing the refractory in the cells and helping reduce the likely incidence of biscuiting of the refractory.

In the depicted embodiment with the reinforcement segments 30 each extending into a respective opening 24, the two anchor strips 18 are identical except for the side the reinforcement segments 30 extend from. With the exception of the reinforcement segments 30, the first and second anchor strips 18 can be provided as the same part. Thus, in embodiments without the reinforcement segments 30 (or with two reinforcement segments in two of the openings and no reinforcement segments in the other two openings), one part is made for use as the two anchor strips 18.

The reinforcement segments 30 each are typically positioned extending from a respective one of the branch segments 16, for example from an intermediate portion of the branch segments (between the outer end portion and the mounting element 14). And each reinforcement segment 30 is typically angled with respect to its respective branch segment 16, for example perpendicular to its respective branch segment 16 and parallel to the other branch segment 16 forming the opening 24 it extends into). In the depicted embodiment, each reinforcement segment 30 extends from its respective intermediate portion of its respective branch segment 16, but not at the center point between the mounting element 14 and the outer edge of the outer portion 28 (i.e., at an off-center position). In this way, with a plurality of the anchors 10 installed into a symmetrically arrayed anchor system for use, each cell formed by two adjacent openings 24 of two adjacent anchors 10 has two reinforcement segments 30 extending into it in a parallel but not linearly aligned (i.e., offset) arrangement (see FIG. 24). This offset arrangement of the reinforcement segments 30 avoids linear seams in the refractory material held in the cells (which linear seams can over time form cracking zones where the refractory material tends to fail) to decrease the likelihood of biscuiting, and at the same time it forms "pinch" or "catch" surfaces that help retain the refractory material in the cells. In some embodiments, the reinforcement segments extend non-perpendicularly to avoid right angles in an effort to help decrease the likelihood of biscuiting.

Figure 2:
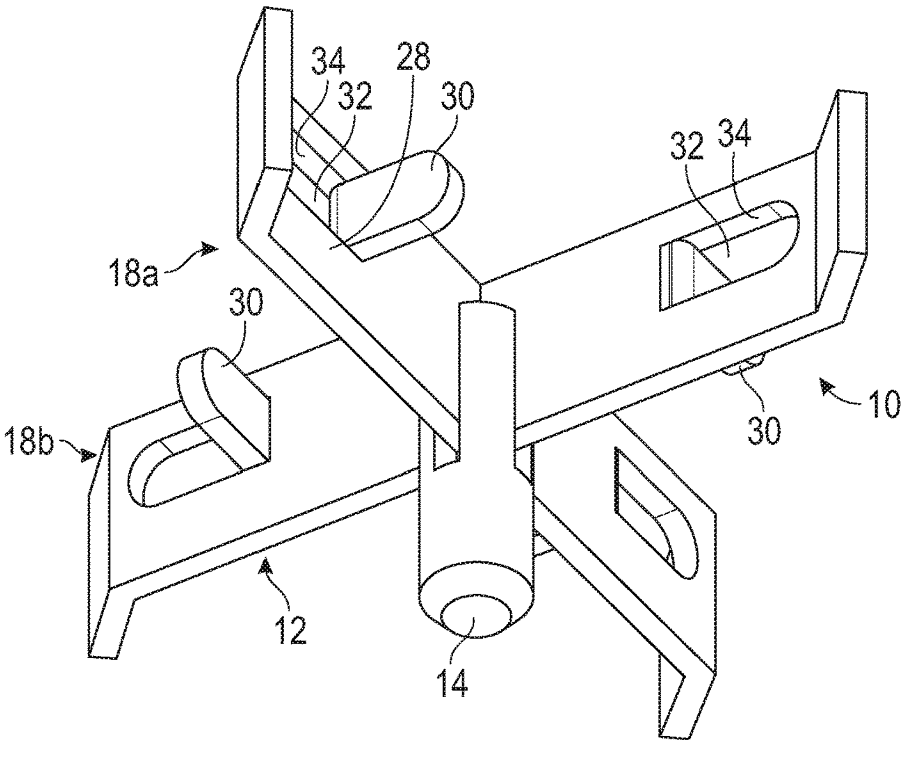
FIG. 2 is a bottom perspective view of the refractory anchor of FIG. 1.

In addition, the main body 12 includes voids 32 that provide additional contact surface area (the void-defining exposed through-surfaces 34 of the respective main-body segments) for engaging and securing the refractory in place (see FIG. 2). In this way, the reinforcement segments 30 and the void through-surfaces 34 provide better retention/anchoring of the refractory material (more contact surface area), and the voids 32 provide for interlinking of the refractory material (which typically is flowable during installation through the voids into and extending between adjacent cells) so it is not isolated into individual cells, to provide even better retention/anchoring of the refractory material and further avoid biscuiting.

In typical embodiments, the reinforcement segments 30 and the voids 32 can have the same configuration (size and shape, though positive/solid and negative/void), as depicted, or they can have similar or different configurations if desired. For example, each the reinforcement segment 30 can be formed by a portion of the respective branch segment 16 that is angled from the adjacent/remainder portion of that branch segment 16 to leave behind the respective void 32 in that branch segment 16, with that void 32 having substantially the same configuration as the respective reinforcement segment 28 that vacated that void 32. And in other embodiments, the reinforcement segments are separate pieces attached to the main body, with or without inclusion of the voids.

In the depicted embodiment, the main body 12 has substantially level (e.g., planar or regular) top and bottom sides (surfaces or edges). In other embodiments, the bottom side of the main body has one or more elevated portions forming one or more underbody gaps with the vessel shell (or forming a greater-height gap than the other/unelevated portions of the bottom side). Such underbody gaps form flow passageways that allow the refractory to flow (during installation) under the main bodies of the anchors to interlink the refractory material (after curing) in the adjacent cells so it is not isolated in any individual cell to provide even better retention/anchoring of the refractory material and further avoid biscuiting.

Turning now to the mounting element/feature 14, it is designed for mounting the anchor 10 to a wall/shell of the thermal vessel (not shown) to be protected. In the depicted embodiment, the mounting feature 14 is designed for conventional stud-welding installation methods and equipment, and it thus includes a stud (e.g., a cylinder) 38 defining a recess (e.g., a semi-spherical tap hole) 40 for receiving a metal interface/pilot element (e.g., a solid ball) 39 (see FIGS. 15-16). The interface/pilot element 39 is made of a different material (relative to the stud 38) that has a lower melting point so that it melts before the stud 38 for optimal stud-welding. For example, the stud 38 can be made of steel and the interface/pilot ball can be made of aluminum. Because of this, the interface/pilot element 39 is a separate component (relative to the stud 38 and to the rest of the anchor 10).

The stud 38 and the interface/pilot element 39 can have a configuration of a conventional type as is suitable for conventional one-step stud-welding techniques, so additional details are not provided for brevity. Generally, during stud-welding installation of the anchor 10, the interface/pilot element 39 and the bottom of the stud 38 are quickly heated and melted into a molten pool, before the rest of the anchor heats to its melting point. Also, the length of the stud 38, the bevel at the free end of the stud 38, and the interface/pilot element 39 being diametrically centered on the free end of the stud 38, together ensure that, during stud-welding installation, the arc opens to the stud 38 (and not to the anchor main body 12) to quickly heat and melt the interface/pilot element 39, and then the stud 38 quickly heats further and melts evenly. The mounting feature 14 typically includes a single stud 38 positioned at the center portion of the main body 12, with no other attachment of the anchor 10 to the vessel shell, so that vessel expansion and contraction does not stress the weld and weaken it. In other embodiments, the mounting feature is configured for manual welding or other conventional anchor attachment methods known in the art, for example metal inert gas (MIG) welding, tungsten inert gas (TIG) welding, or stick welding (also referred to as shielded metal arc welding (SMAW)).

The stud 38 can be provided with a length selected for the particular application to meet the refractory lining requirements. A longer length creates a greater gap between the main body 12 and the thermal vessel wall for greater refractory flow and interlinking between adjacent cells. A shorter length results in less metal in the anchoring system of multiple anchors 10, which in turn results in less coking/failure. In example embodiments, the stud 38 has a length of about 19 mm to about 75 mm (e.g., about 25 mm) for applications such as, but not limited to, cyclones and air grids, for providing under-body gaps (between the bottom of the main body 12 and the thermal vessel surface) for the refractory material to flow (during installation, before curing) of for example about 19 mm or about 38 mm.

As noted above, the mounting element 14 and the main body 12 inter-engage and assemble together. In the depicted embodiment, the anchors strips 18*a* and 18*b* have respective slots 44*a-b* (collectively, the slots 42) formed in their respective center portions 20*a-b* to provide this inter-engagement and produce the X-shaped main body 12 (see FIG. 5). For example, the slots 42 typically extend perpendicularly to the longitudinal axis of the strips 18 and extend partially through the respective center portions 20, with the first/upper strip 18*a* having its slot 42*a* in its bottom and the second/lower strip 18*b* having its slot 42*b* in its top. In this way, the strips 18 can be positioned perpendicularly, with their slots 42 aligned, and then seated together into inter-engagement with each slot 42 receiving the other slot 42 (and the unslotted remaining center portion of the other strip 18). In this embodiment, the two strips 18 are identical, except that the reinforcement tabs 30 extend in opposite directions (see FIGS. 7 and 9), which contributes to case of manufacturing.

In addition, the stud 38 of the depicted embodiment includes an X-shaped slot 44 that receives the center portions 20 of the two strips 18 forming the main body 12 (see FIGS. 12-15). So the X-shaped main body 12 (with its fours branch segments 16 forming the X shape) seats into the X-shaped slot 44 of the mounting stud 38. In typical use, the two strips 18 are positioned with their slots 42 aligned and then seated together to form the X-shaped main body 12, then the X-shaped main body 12 is seated into the X-shaped slot 44 of the mounting stud 38, and then the assembly is welded together to form the anchor 10 ready for delivery to the job site for installation. For example, the strips 18 and stud 38 can be welded together in a one-step spot welding, rapid-arc welding, or automatic (robotic) MIG welding process. This results in a strong attachment between the anchor body 12 and the mounting element 14 that can withstand use in thermal vessels under high pressure without being a weak point that is more prone to rupturing and failing.

This multi-piece design of the anchor 10 enables using different materials for the main body 12 and the mounting stud 38, which is particularly desirable in applications in which the thermal vessel being protected is pressurized and/or must meet a related weld code (e.g., ASTM, ANSI, and California Weld Code for pressure vessels), for example in petrochemical processes (reactor side). In example embodiments, the main-body strips 18 are made from one of carbon steel or stainless steel 304, 308, 309, 310, 316, 321, 330, 410, 410S, and 601, and the stud 38 is made from another one of those grades of steel. For example, the stud 38 can be made of a metal alloy of carbon steel and stainless steel 308 and the anchor strips 18 of a different metal alloy of carbon steel and stainless steel (such as stainless steel 304 or another grade and/or series of steel). In other embodiments, the main-body strips 18 and the stud 38 are made from different ones of any 3xx, 4xx, or 6xx series steel. The anchor strips 18 and stud 38 can be made using conventional manufacturing equipment and techniques, for example the strips 18 can be stamped and the stud 38 can be machined and/or extruded, which can result in much faster production (e.g., five times) of the anchors 10 relative to conventional anchors.

This bi-metallic design enables the stud 38 to be made of the same material (or the same base/primary material) as the thermal vessel wall/shell to provide for longer-lasting weld/attachment, and the anchor strips 18 to be made of a different material selected for chemical resistance and reaction (relative to the refractory material), thermal cycling, etc., to provide for longer-lasting refractory retention. As such, the bi-metallic anchors 10 have a longer life/time before they need to be replaced.

In other embodiments, the main body 12 and the welding stud 38 are made of the same material, such as a single metal alloy (e.g., carbon steel and stainless steel such a 300 or 600 series). And in still other embodiments, the main body and the welding stud are made of a single component piece of a material, such as a single metal alloy that is sand-cast (or otherwise fabricated by single-use molds) into a one-piece part.

Accordingly, then anchor 10 provides advantages over prior refractory anchoring systems. The X-shaped anchor body 12 allows for the refractory material to work between all sides of the anchor 10 without any separation. The X-shaped anchor body 12 also minimizes the amount of material in the center of the anchor body to reduce unwanted hotspots and heat transfer. The symmetry of the X-shaped anchor body 12 enables each of the two strips 18 to be made from the same piece of raw material, with the same manufacturing steps, except with the only difference between the two strips being the reinforcement segments 30 being formed in opposition directions (e.g., as a final manufacturing step), for example by stamping for much faster, easier, and cheaper manufacturing. The dual-part design (one anchor body 12 and one stud 38) allows for multiple metallurgy between the stud 38 and anchor body 12 as well as various lengths of studs 38 to be used depending on the application. The slotted attachment of the mounting stud 38 to the anchor body 12 enables a strong attachment and case of manufacturability. And an end-use result is that only fourteen anchors 10 per square foot are required to achieve desired structural integrity of refractory installation, which is substantially lower than prior systems (with the exception of the anchor of co-owned U.S. Pat. No. 10,508,861, issued Dec. 19, 2019, which is hereby incorporated by reference herein). Also, anchoring systems of the anchors 10 can be installed about ten times faster than conventional HEX-MESH sheet.

Furthermore, because the assembled anchor 10 is a single stand-alone unit, no clinching mechanisms are needed to fasten multiple parts together, thereby eliminating a point of failure (e.g., due to expansion and contraction during thermal cycling) and simplifying manufacture. Also, the anchors 10 are modular and individually installed so that the effects of vessel expansion and contraction are minimized to help reduce the risk of biscuiting.

Referring now to FIGS. 17-22, there is shown a refractory anchoring device 110 according to a second example embodiment of the invention. The anchor 110 can be substantially the same as that of the first embodiment, with exceptions as noted. The anchor 110 includes a main body 112 and a mounting element or feature 114, with the main body 112 being the same as in the first embodiment and the mounting element being different from the first embodiment.

In particular, the mounting element 114 of this embodiment is designed for plug welding to the main body 112 for an improved attachment. As such, the mounting element 114 includes a stud 138 with an X-shaped notch 144 for interengaging the main body 112. But the stud 138 has an upper anchor-attaching portion 160 that is wider than a bottom vessel-attaching portion 168, with the upper portion 160 including a peripheral upstanding wall 162 defining an internal longitudinal bore 164, and with a shoulder 166 between the upper and lower portions 160 and 168. The internal bore 164 receives a conventional plug (not shown) that melts and welds to the anchor strips 118 and the anchors stud 138. In this way, the main anchor body 114 can be attached to the mounting stud 138 (e.g., during the manufacturing process) by a conventional plug weld, for example by robots using a MiG welding process.

In another aspect, the invention relates to systems of plural refractory anchoring devices. The systems include a number of refractory anchors having unenclosed semi-polygonal cell openings, for example the anchors 10 and/or 110 described herein, any of the other anchors disclosed herein, variations thereof, and/or other refractory anchors having unenclosed cell openings in the same or other semi-polygonal shapes. In the depicted embodiments, the refractory anchoring devices are arranged in the refractory anchoring systems so that the unenclosed semi-polygonal (semi-hexagonal and triangular) cell openings of adjacent ones of the anchoring devices cooperate to form substantially hexagonal and rhombus shaped cells (including regular or oblong hexagonal and rhombus shapes) for retaining the refractory. In other embodiments, such refractory anchors can be arranged into systems to form cells having other polygonal shapes for retaining the refractory. Examples of such anchoring systems are shown in the figures described below, which are representative for explanatory purposes only and only show portions of such anchoring systems and vessels, which are typically much larger and form an enclosure defining the thermal-process environment to be protected.

Figure 23:
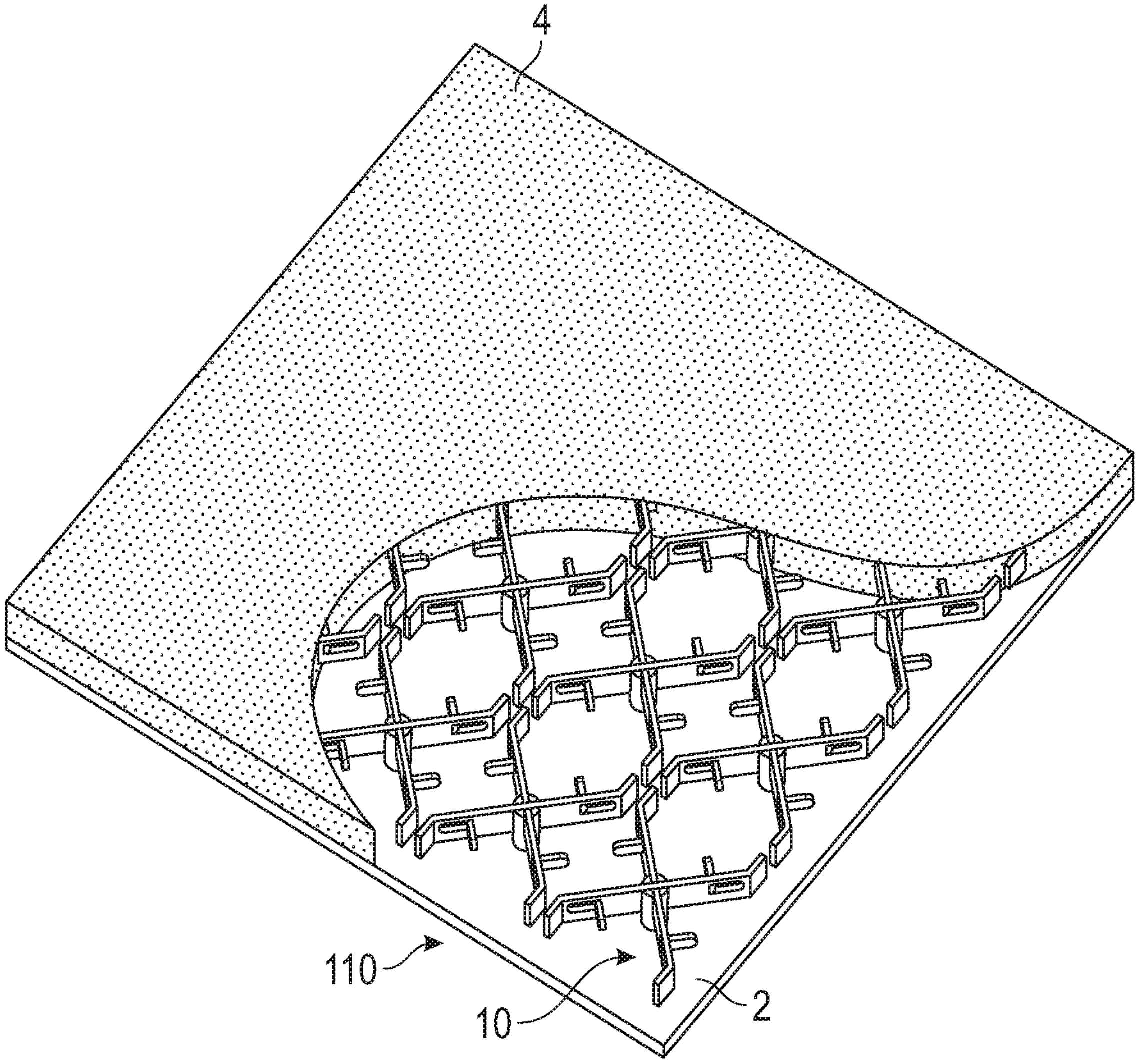
FIG. 23 is a perspective view of a portion of a first anchoring system including an array of the refractory anchors of FIG. 1 securing a refractory material, with portions of the refractory material removed to reveal the underlying anchors, forming generally hexagonal, interlinked cells.
Figure 24:
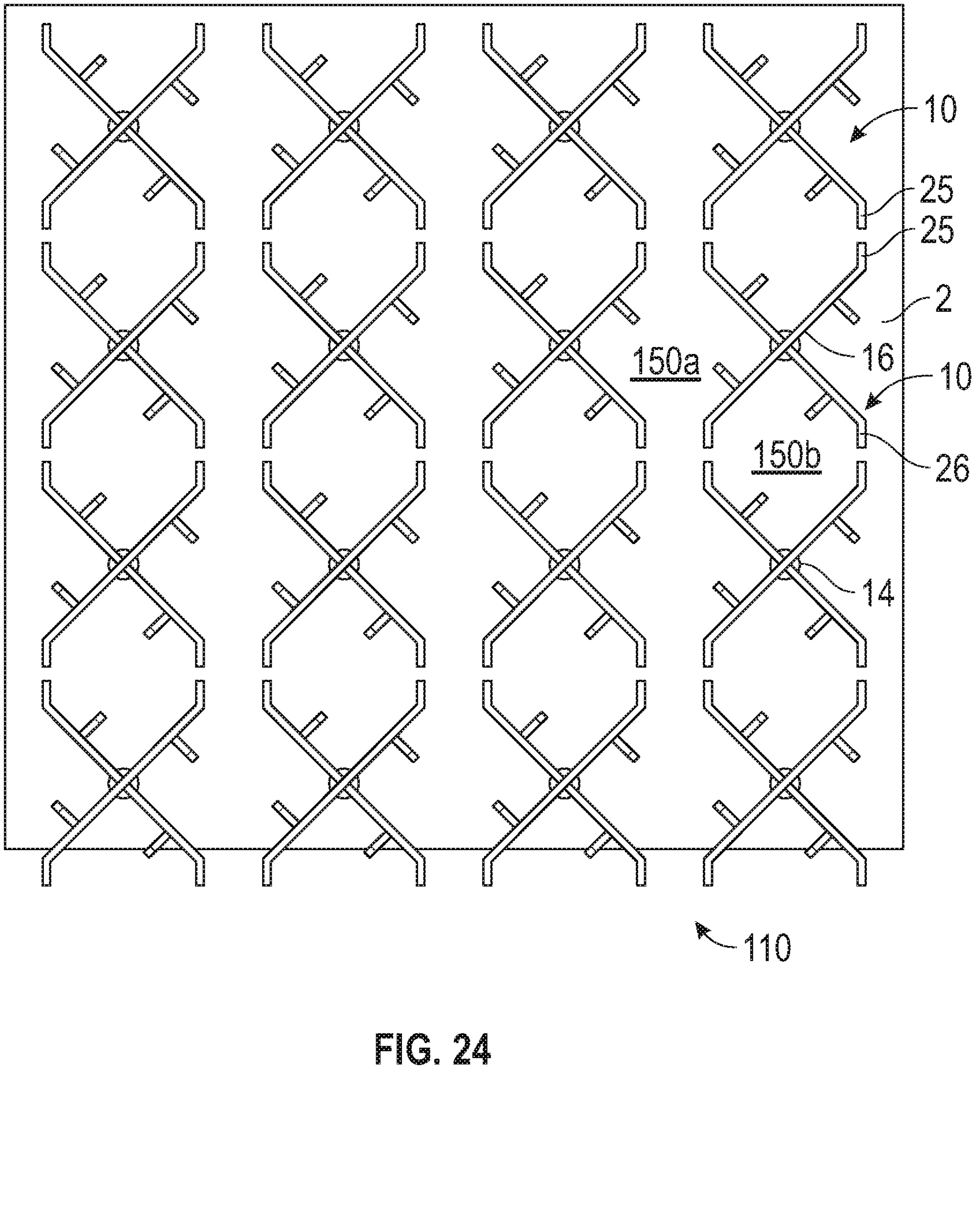
FIG. 24 is a top view of the first anchoring system portion of FIG. 23.

FIGS. 23-24 show a first system 210 of the anchors 10 mounted to a vessel shell 2 in a first arrangement, with a portion of the refractory 4 installed in FIG. 23. In this system 210, the anchors 10 are arranged in an ordered array (or grid) of rows and columns to cooperatively define an ordered array of generally hexagonal end cells 250*a* and generally rhombus/diamond shaped side cells 250*b* (collectively, the cells 250) in a tessellated pattern. Each of the generally hexagonal end cells 150*a* is formed by two adjacent end-to-end ones of the semi-hexagonal end openings 24*b* and 24*d* of adjacent anchors 10, with each of the cells 250*a* having all six hexagonal sides formed at least in part by a segment (branch 16 or extension 26) of one of the anchors 10. And each of the generally rhombus/diamond side cells 250*b* is formed by two adjacent side-by-side ones of the triangular openings 24*a* and 24*c* of adjacent anchors 10, with each of the side cells 250*b* having all four rhomboid sides formed at least in part by a segment (branch 16) of one of the anchors 10. In embodiments with the anchors 10 having branch segments angled apart at 90 degrees to form right triangular side openings, the resulting side cells 250*b* have a right/orthogonal rhombus shape (i.e., a square oriented rotated by 45 degrees to form an orthogonal diamond), as depicted.

As depicted, there are spaces between the adjacent anchors 10, so the cells 250 are not completely bounded or "closed" (they are at least partially open), and thus these cells 250 are substantially but not completely enclosed. However, at least four of the six hexagonal cell 250*a* sides are formed in their entirely by one of the anchor segments, and no more than two are not, with those two non-contiguous (i.e., open) sides having the majority of their lengths formed by two adjacent anchor segments and with the anchor spacings providing flow passageways between adjacent cells 250 for the refractory 4 to flow (during installation) and interlink the adjacent cells (after curing, for use). And at least two of the six rhombus/diamond cell 250*b* sides are formed in their entirely by one of the anchor segments, and no more than two are not, with those two non-contiguous (i.e., open) sides having the majority of their lengths formed by two adjacent anchor segments and with the anchor spacings providing flow passageways between adjacent cells 250 for the refractory 4 to flow (during installation) and interlink the adjacent cells (after curing, for use).

The extension segments 26 of each of the anchors 10 in each column are in substantial alignment, with the free ends/edges 25 of the extension segments 26 of adjacent anchors 10 in substantial alignment but spaced apart, so that the end openings 24*b* and 24*d* of adjacent anchors 10 in the same column together define one of the hexagonal cells 250*a*. And the extension segments 26 of each of the anchors 10 in each row are substantially co-extensive and parallel, but spaced apart, so that the side openings 24*a* and 24*c* of adjacent anchors 10 in the same column together define one of the rhombus/diamond cells 250*b*. Alternatively stated, the mounting elements 14 of the anchors 10 are all aligned in the columns and rows of the anchors 10.

The spacing between the anchors 10 in each column and row is far/large enough to ensure no physical contact during thermal cycling expansion and contraction during and between high-temperature uses and further to provide a passageway for refractory to flow during installation to interlink the refractory in adjacent end-formed cells. But this spacing is close/small enough to maintain good surface contact between the anchors and the refractory by minimizing spaces in the cells free of any part of the anchors and further to keep the end-formed cells generally hexagonal. For example, the spacing between the anchors 10 is typically less than (or about the same as) the length of each of the extension segments 26 (e.g., about 5 mm to about 10 mm), and it can be long enough that the end-formed cells 250*a* are slightly oblong in their generally hexagonal and rhombus shape, as depicted. Without regard to forming true, regular hexagonal-shaped cells 250*a* and true, regular diamond-shaped cells 250*b*, and based simply on industry standards, the spacing is usually about 2 mm to about 20 mm, typically about 10 mm to about 15 mm, and most typically about 15 mm.

The result is an array (grid) of generally hexagonal and rhombus refractory-holding cells 250 that is installed without any time-consuming and/or difficult rolling or fitting steps required. Also, the risk of biscuiting is reduced because the individual anchors 10 are each individually mounted to the vessel shell 2 and spaced apart sufficiently that the thermal-stress effects of vessel expansion and contraction are minimized. Further, less metal anchor material is used (e.g., relative to HEXMESH systems), for example because the anchors 10 are spaced apart in each column and in each row, and also by including optional features such as the body voids (e.g., flow-through passageways). At the same time, though, a more robust anchor-and-refractory protective barrier system is achieved, for example because of the resulting polygonal (e.g., hexagonal and rhombus) cells, and also by including optional features such as the reinforcements (e.g., two in each resulting cell) and the body voids (e.g., where the reinforcements vacated). This helps extend the life of the anchor-and-refractory barrier system, because the refractory protects the metal anchors from chemical attack, so less metal material means less opportunities/locations for potential failures. In this way, the flow passageways between adjacent cells of adjacent anchors, including the body voids and the adjacent-anchor spacings, provide the benefits of interlinked refractory for better holding/retention and of less metal used for less coking/failure.

In addition, because of the column-to-column and row-to-row spacing between adjacent anchors 10, the resulting generally cells 250 are not necessarily perfectly hexagonal or diamond-shaped (i.e., not equilateral) but instead are slightly oblong (e.g., irregular or non-equilateral). (The cells 250*a* of this embodiment are generally hexagonal for familiarity to customers, but it is not necessary for the cells to be perfectly or even generally (including oblong) hexagonal in shape.) As depicted, for example, the generally hexagonal cells 250*a* formed by adjacent end openings are oblong/elongate. In other embodiments, the extension segments are shorter than the branch segments so that even with the end-to-end spacing of adjacent anchors the resulting cells form regular/equilateral hexagons.

Figure 25:
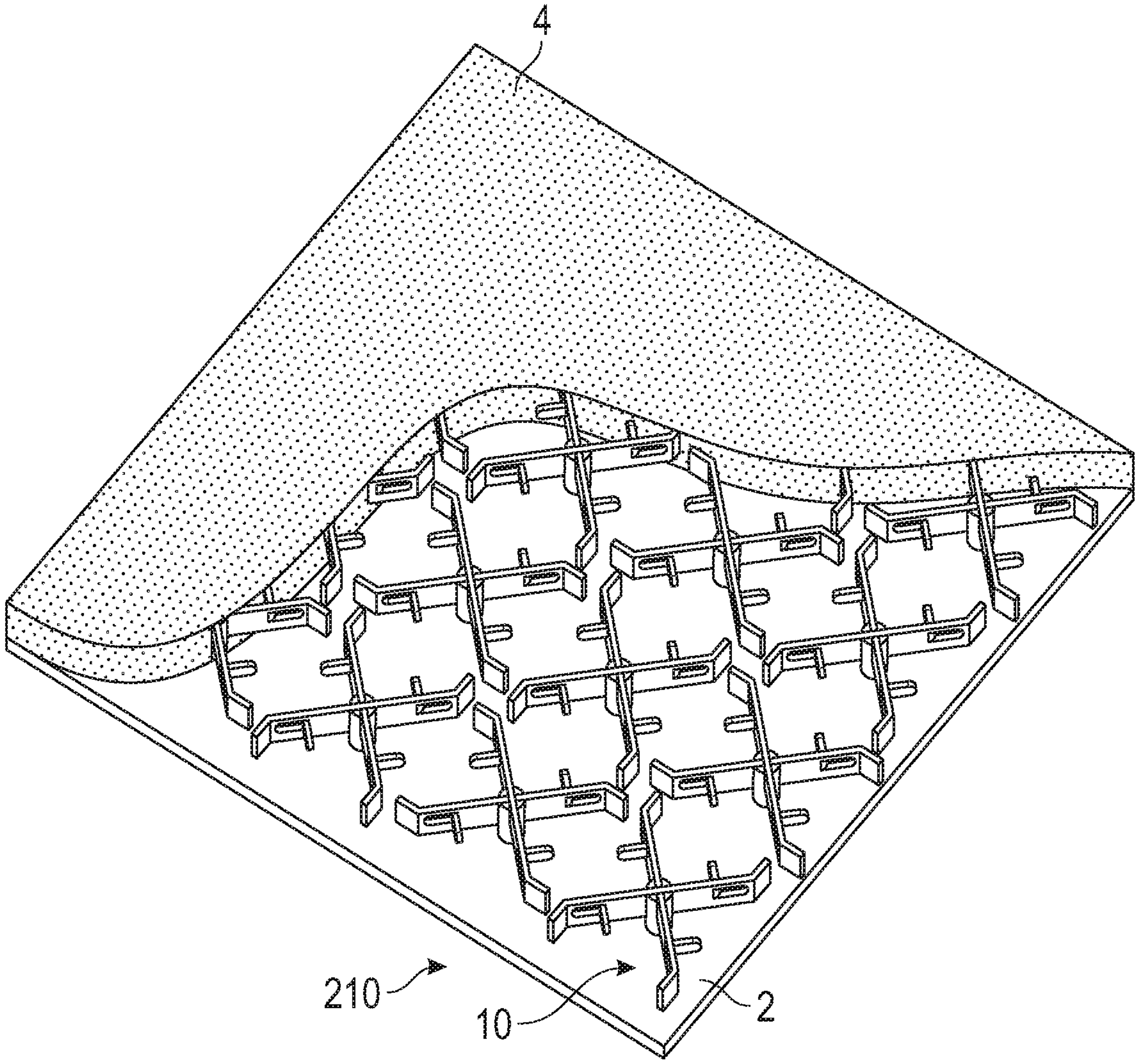
FIG. 25 is a perspective view of a portion of a second anchoring system including an array of the refractory anchors of FIG. 1 securing a refractory material, with portions of the refractory material removed to reveal the underlying anchors, forming generally hexagonal, interlinked cells.
Figure 26:
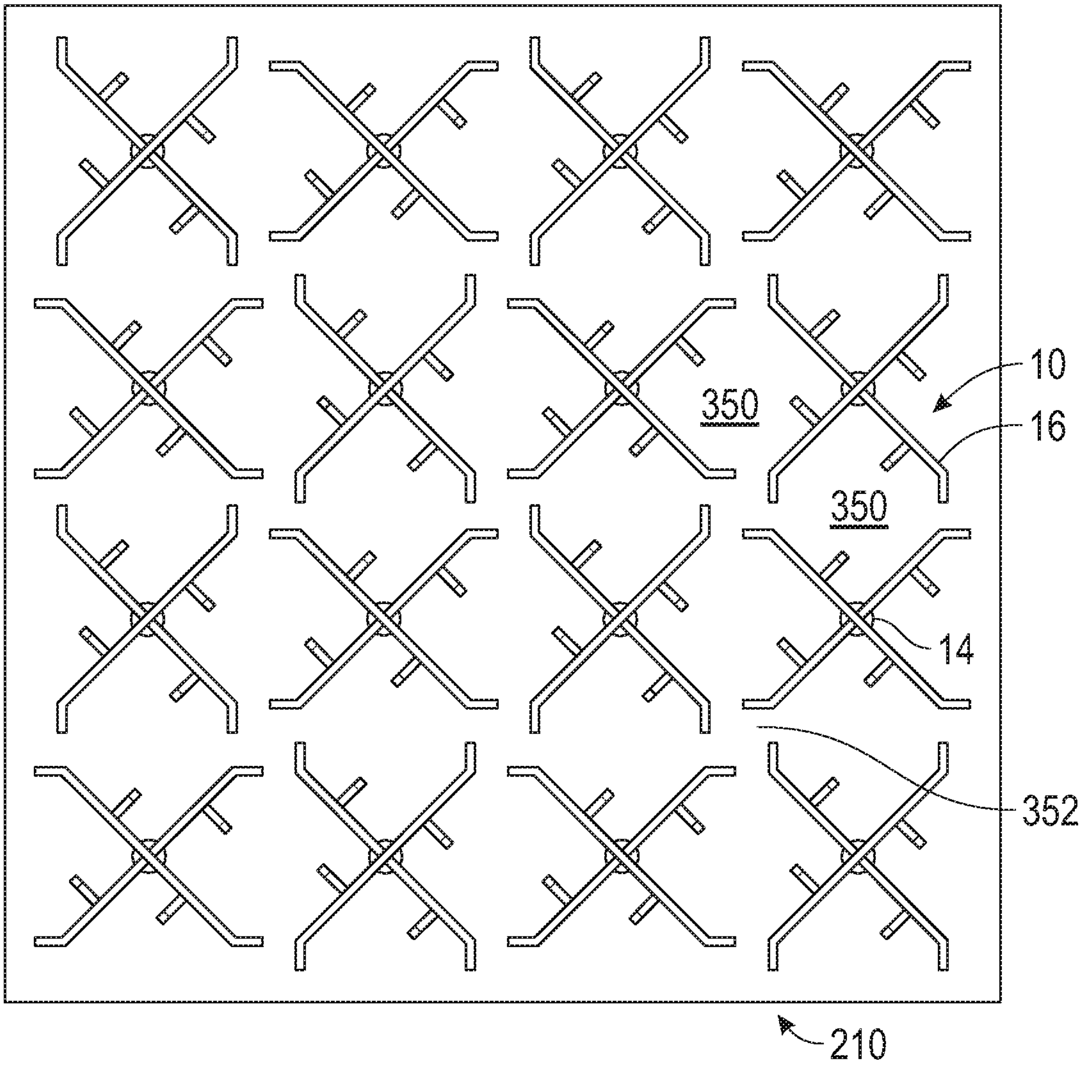
FIG. 26 is a top view of the first anchoring system portion of FIG. 25.

FIGS. 25-26 show a second system 310 of the anchors 10 mounted to a vessel shell 2 in a second arrangement, with a portion of the refractory 4 installed in FIG. 25. This second system 310 is similar to the first system 210, with the anchors 10 arranged in an ordered array (grid) to cooperatively define the cells 350 in a tessellated pattern, except as noted herein.

In particular, in this system 310, alternating ones of the anchors 10 are oriented at a 90-degree rotation. However, the mounting elements 14 of the anchors 10 are still all aligned in the columns and rows of the anchors 10. This results in the cells 350 each having a generally hexagonal shape, with each cell 350 having two non-contiguous cell walls formed by the two extension segments 26 of one of the anchors 10, and with the gaps formed by the spacings between adjacent anchors 10 being non-symmetrical and formed opposite those two extension segments 26. Also, for any four adjacent anchors 10 (two across and two down), their innermost-positioned extension segments 26 are adjacent and form a square internodal cell 352 that interconnects and provides a flow passageway between all four of the cells 350 formed by the four anchors 10.

In another aspect, the invention relates to a method of protecting thermal vessels with refractory linings by installing systems of refractory anchoring devices having unenclosed semi-polygonal openings to form anchor systems having polygonal cells for retaining the refractory. The method can include installing a number of the anchors 10 and/or 110, and/or any of the other anchors disclosed herein having unenclosed semi-polygonal openings, and in some embodiments can additionally include installing other refractory anchors having unenclosed cell openings with other semi-polygonal shapes.

For example, when using the anchors 10, the method includes individually positioning each of the anchors 10 relative to the vessel shell and individually mounting them in place so that the semi-polygonal openings 24 of adjacent anchoring devices 10 cooperate to form an ordered array/system 210 or 310 of generally hexagonal-shaped cells 250 or 350. In some embodiments, the refractory anchoring devices 10 include a single stud-welding stud 38 and the mounting process includes stud-welding the anchor devices 10 in place. The method contributes to providing the advantages of the anchors and anchor systems as described herein. The refractory can then be installed into the cells 250 or 350 to complete the refractory lining process for the thermal vessel.

It is to be understood that this invention is not limited to the specific devices, methods, conditions, and/or parameters described and/or shown herein, and that the terminology used herein is for the purpose of describing particular embodiments by way of example only. Thus, the terminology is intended to be broadly construed and is not intended to be unnecessarily limiting of the claimed invention. For example, as used in the specification including the appended claims, the singular forms "a," "an," and "one" include the plural, the term "or" means "and/or," and reference to a particular numerical value includes at least that particular value, unless the context clearly dictates otherwise. In addition, any methods described herein are not intended to be limited to the specific sequence of steps described but can be carried out in other sequences, unless expressly stated otherwise herein.

While the invention has been shown and described in exemplary forms, it will be apparent to those skilled in the art that many modifications, additions, and deletions can be made therein without departing from the spirit and scope of the invention as defined by the following claims.

The invention claimed is:

1. A refractory anchor comprising:
- a main anchor body comprising:
  - a plurality of anchor branch segments angled with respect to each other;
  - a plurality of extension segments; and
  - a plurality of reinforcement segments, each reinforcement segment and each extension segment extends outwardly from a respective one of the plurality of anchor branch segments, wherein each of the plurality of extension segments is angled relative to the respective one of the plurality of anchor branch segments; and
- a mounting stud configured to at least partially receive the main anchor body, the mounting stud comprising:
  - a bottom vessel-attaching portion; and
  - an upper anchor-attaching portion that is wider than the bottom vessel-attaching portion, the upper anchor-attaching portion comprising:
    - a peripheral upstanding wall defining an internal longitudinal bore; and
    - a shoulder between the upper anchor-attaching portion and the bottom vessel-attaching portion.

2. The refractory anchor of claim 1, wherein each of the plurality of anchor branch segments comprise:
- a primary anchor strip including a first slot extending through a portion of the primary anchor strip; and
- a secondary anchor strip including a second slot extending through a portion of the secondary anchor strip, the second slot configured to receive the first slot.

3. The refractory anchor of claim 2, wherein the primary anchor strip and the secondary anchor strip comprise:

a first outer portion;

a central portion; and a second outer portion spaced apart from the first outer portion by the central portion, wherein the central portion of the primary anchor strip is configured to engage the central portion of the secondary anchor strip.

4. The refractory anchor of claim 3, wherein the central portion of the primary anchor strip and the central portion of the secondary anchor strip are coupled to the mounting stud.

5. The refractory anchor of claim 1, wherein the mounting stud includes an X-shaped notch configured to at least partially receive the main anchor body.

6. The refractory anchor of claim 1, wherein the plurality of anchor branch segments form a plurality of unenclosed cell openings that include a first side opening, a second side opening opposite the first side opening, a first end opening, and a second end opening opposite the first end opening.

7. The refractory anchor of claim 6, wherein the plurality of extension segments define extending portions of the first end opening and the second end opening.

8. The refractory anchor of claim 7, wherein the first side opening and the second side opening are triangular, and the first end opening and the second end opening are semi-hexagonal.

9. The refractory anchor of claim 6, wherein each of the plurality of reinforcement segments extends into a respective one of the plurality of unenclosed cell openings.

10. The refractory anchor of claim 1, wherein each of the plurality of anchor branch segments is angled at 90 degrees relative to each adjacent one of the plurality of anchor branch segments.

11. The refractory anchor of claim 1, wherein each of the plurality of extension segments defines a first length, each of the plurality of anchor branch segments defines a second length, and wherein the first length is less than half of the second length.

12. The refractory anchor of claim 1, wherein each of the plurality of reinforcement segments extends outwardly from the respective one of the plurality of anchor branch segments at an obtuse angle.

* * * * *